United States Patent
Vitale

(10) Patent No.: US 11,752,955 B2
(45) Date of Patent: Sep. 12, 2023

(54) VEHICLE INTERIOR PANEL AND METHOD OF MANUFACTURING SAME

(71) Applicant: Faurecia Interior Systems, Inc., Auburn Hills, MI (US)

(72) Inventor: Peter Vitale, Windsor (CA)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 198 days.

(21) Appl. No.: 17/156,341

(22) Filed: Jan. 22, 2021

(65) Prior Publication Data

US 2022/0234521 A1 Jul. 28, 2022

(51) Int. Cl.

| | |
|---|---|
| *B60R 13/02* | (2006.01) |
| *B29C 33/42* | (2006.01) |
| *B32B 3/02* | (2006.01) |
| *B32B 27/06* | (2006.01) |
| *B32B 5/18* | (2006.01) |
| *B60J 10/70* | (2016.01) |
| *B60J 10/79* | (2016.01) |
| *B32B 3/08* | (2006.01) |

(52) U.S. Cl.
CPC ........ *B60R 13/0256* (2013.01); *B29C 33/424* (2013.01); *B32B 3/02* (2013.01); *B32B 5/18* (2013.01); *B32B 27/065* (2013.01); *B32B 3/08* (2013.01); *B32B 2605/003* (2013.01); *B60J 10/70* (2016.02); *B60J 10/79* (2016.02); *B60R 13/02* (2013.01)

(58) Field of Classification Search
CPC ... B60R 13/0256; B60R 13/02; B29C 33/424; B29C 14/0001; B29C 45/0025; B29C 45/1671; B29C 45/372; B29C 2045/04; B32B 5/18; B32B 27/065; B32B 3/08; B32B 2605/003; B60J 10/70; B60J 10/79; B29K 2105/04; B29L 2031/3008
See application file for complete search history.

(56) References Cited

U.S. PATENT DOCUMENTS

| | | | |
|---|---|---|---|
| 2007/0261224 A1* | 11/2007 | McLeod | B29C 37/0082 29/428 |
| 2011/0068607 A1 | 3/2011 | Ott et al. | |
| 2013/0134736 A1 | 5/2013 | Kuwabara et al. | |
| 2013/0260086 A1* | 10/2013 | Zellner, Jr. | B29C 44/145 428/102 |
| 2020/0122649 A1* | 4/2020 | Lehman | B29C 33/424 |

FOREIGN PATENT DOCUMENTS

| | | | | |
|---|---|---|---|---|
| GB | 2421212 A | * | 6/2006 | ........ B29C 33/424 |
| JP | 2009208574 A | | 9/2009 | |
| JP | 2017165019 A | | 9/2017 | |
| WO | 2012169340 A | | 12/2012 | |

OTHER PUBLICATIONS

European Search Report for Application No. 22152595.9, dated Jul. 6, 2022, 7 pages.

* cited by examiner

*Primary Examiner* — Lori L Lyjak
(74) *Attorney, Agent, or Firm* — Reising Ethington P.C.

(57) ABSTRACT

A vehicle interior panel such as an instrument panel includes a substrate having a thickness between 0.5 mm and 2.25 mm, inclusive, a decorative layer, and an intermediate layer located between the substrate and the decorative layer. A post-form warpage of the substrate is less than 15 mm at an edge region of the substrate. A serpentine rib located near the edge region helps impart structural rigidity to the panel during a foaming process to achieve an adequate degree of post-form warpage.

15 Claims, 5 Drawing Sheets

VEHICLE INTERIOR PANEL AND METHOD OF MANUFACTURING SAME

TECHNICAL FIELD

The present disclosure is related generally to vehicle interiors and, more particularly, to instrument panels and other vehicle interior panels having a substrate, foam layer, and decorative layer.

BACKGROUND

Weight reduction in vehicles is a common goal in the automotive industry. Accordingly, decreasing the thickness of more rigid parts such as substrates in vehicle interior panels can help reduce weight. However, reducing the thickness of the substrate can result in undesirable warpage when the panel is formed, foamed, or molded. JP 2009208574 to Yasushi addresses thermal warpage of an installed instrument panel, but does not contemplate the issue of creating a thin-walled substrate that is more susceptible to deflection during manufacture in particular.

SUMMARY

An illustrative vehicle interior panel such as an instrument panel includes a substrate having a thickness between 0.5 mm and 2.25 mm, inclusive, a decorative layer, and an intermediate layer located between the substrate and the decorative layer. A post-form warpage of the substrate is less than 15 mm at an edge region of the substrate.

In various embodiments, the edge region is a windshield edge and the post-form warpage is in a Z direction.

In various embodiments, a serpentine rib located near the windshield edge.

In various embodiments, an extension flange is located at least partially between the windshield edge and the serpentine rib.

In various embodiments, the extension flange extends out from the windshield edge in an X direction and the serpentine rib projects from the extension flange in the Z direction.

In various embodiments, the serpentine rib is located along a majority of a distal edge of the extension flange.

In various embodiments, the windshield edge has a primary arc, the extension flange has a primary arc, and the serpentine rib has a primary arc, and each primary arc is configured to match a contour of a windshield.

In various embodiments, the serpentine rib includes a plurality of undulations.

In various embodiments, each undulation has a peak and the peak is an angle between 30° and 60°, inclusive.

In various embodiments, the plurality of undulations includes more than 20 undulations.

In various embodiments, each undulation has an amplitude and a wavelength, and a ratio of the amplitude to the wavelength is between 1:6 and 1:2, inclusive.

In various embodiments, there is a method of manufacturing the vehicle interior panel, comprising the steps of molding the substrate and foaming a foam layer between the decorative layer and the substrate to form the intermediate layer.

In various embodiments, the substrate is molded with a serpentine rib.

In various embodiments, the serpentine rib is located on an extension flange.

In various embodiments, the method includes the step of removing the serpentine rib and the extension flange after the foaming step.

It is contemplated that any number of the individual features or steps of the above-described embodiments and of any other embodiments depicted in the drawings or description below can be combined in any combination to define an invention, except where features or steps are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a vehicle interior panel that is particularly configured to reduce manufacture-related warpage in thin-walled substrates. Typical substrate thicknesses for vehicle interior panels are between 2.5 and 4 mm. Thin-walled substrates are about 2.0 mm, or between about 0.5-2.25 mm. The thin-walled substrates help promote vehicle weight reduction. However, these thin-walled structures are more susceptible to warpage during manufacture. For example, when subjected to a foaming process to introduce a foam layer between the substrate and a decorative layer, a certain degree of post-form warpage can be present. With thin-walled substrates that are between 0.5-2.25 mm in particular, the degree of post-form warpage can make the part unsuitable for installation and/or performance in the vehicle. This post-form warpage is present before the panel is installed in the vehicle, and thus is different than thermal warpage that may occur after installation. With substrates that fall into the standard thickness range between 2.5 and 4 mm, the post-form warpage amount does not make the part unsuitable. The panels and manufacturing methods described herein strategically minimize the amount of post-form warpage in a thin-walled substrate by including a serpentine rib to help structurally support and improve the rigidity of the substrate body during manufacture.

Figure 1:
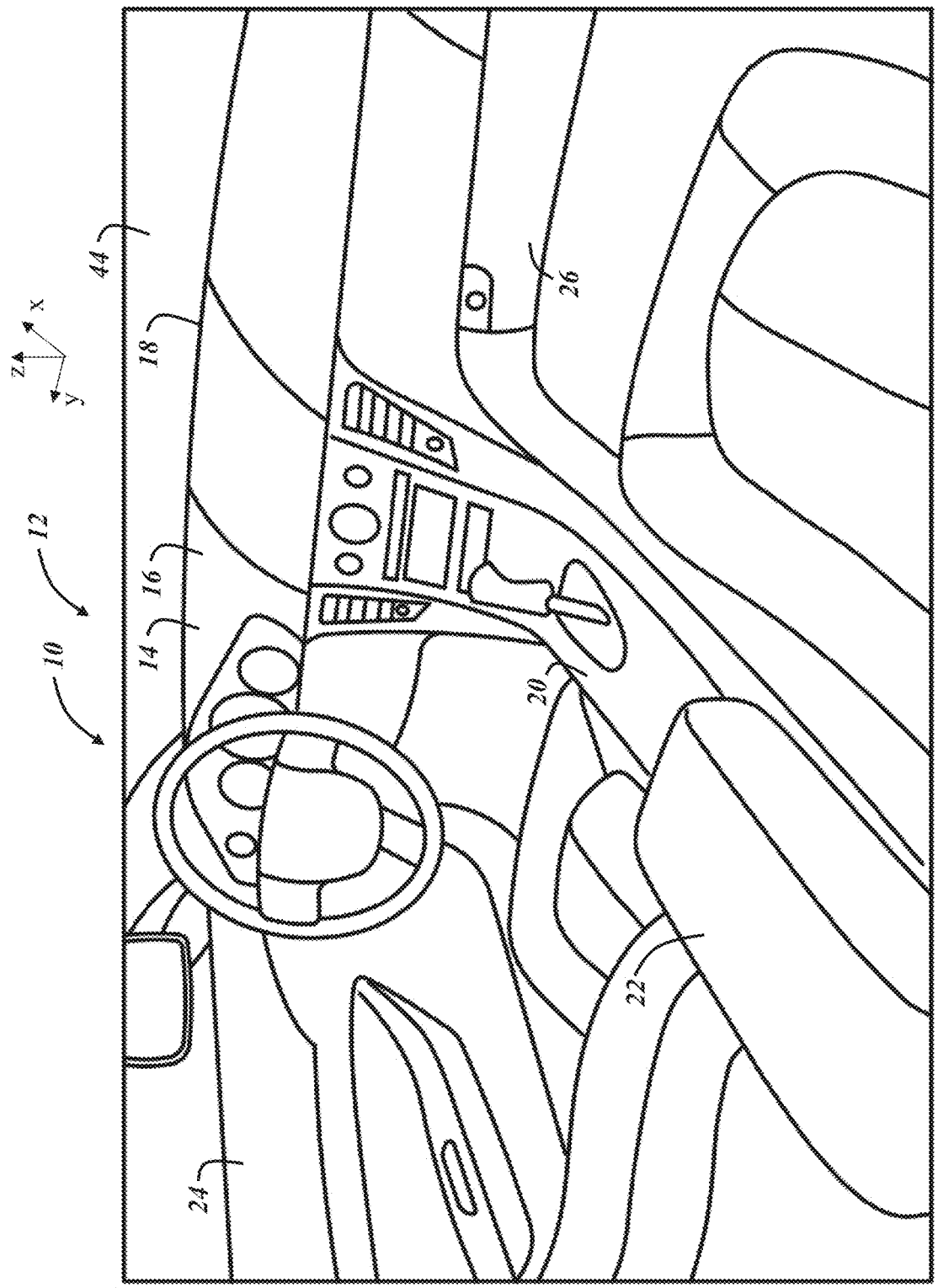
FIG. 1 is a perspective view of the interior of a vehicle passenger cabin showing example vehicle interior panels, such as an instrument panel.

FIG. 1 is a perspective view of an interior of a passenger cabin 10 of a vehicle 12 having an interior panel 14 that is manufactured in accordance with the methodology described below. The interior panel 14 is an instrument panel 16. As will be detailed further, warpage along a windshield edge 18 of the instrument panel 16 can be particularly problematic, especially with thin-walled substrates. However, the structures and methods disclosed herein may be used in the manufacture of other interior panels, such as one or more panels for the center console 20, armrest 22, door panel 24, or one or more storage compartments 26, to cite a few examples. Accordingly, while the discussion below is focused on the instrument panel 16 implementation, the teachings may also be applicable to other vehicle interior panels.

Figure 2:
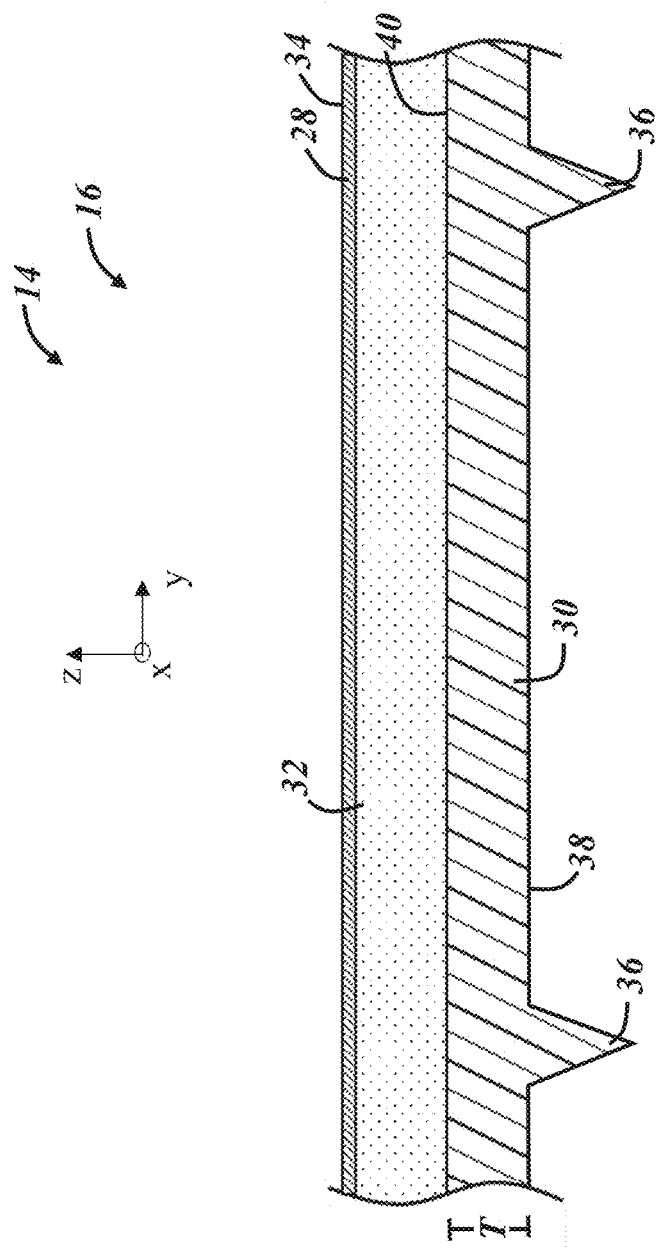
FIG. 2 is a cross-sectional view of a portion of the instrument panel of FIG. 1.

FIG. 2 is a cross-sectional, schematic view of a portion of an embodiment of the vehicle interior panel 14, or more particularly, the instrument panel 16. The vehicle interior panel 14 includes a decorative layer 28, a substrate 30, and an intermediate or foam layer 32 between the decorative layer and the substrate. Adhesive or bonding layers can be included between two or more of the various layers or components of the interior panel 14. Further, other layers may be included in addition to those particularly described, such as one or more protective outer layers, fabric interlayers, conductive electronic layers, or other functional and/or aesthetic layers.

The decorative layer 28 has a decorative side 34, which is the side of the panel 14 lining the interior of the passenger cabin 10 when installed in the vehicle 12. The decorative layer 28 can be a single layer, or it may have a multi-layer structure (e.g., a wood sheet complex having a fabric interlayer and one or more protective outer layers). Other materials for the decorative layer are certainly possible, such as fiber-containing resins, leather, or a polymer skin layer, to cite a few examples. When a resin component is included in the decorative layer, it may be colored or tinted for additional contrast or visual interest. The decorative layer 28 may have a thickness in a range from 0.5 mm to 2.5 mm, or preferably from 0.5 mm to 1.5 mm. In one example, the thickness of the decorative layer 28 is between 0.6 mm and 1.0 mm, or about 0.8 mm. Other thickness ranges and configurations are certainly possible. For example, the decorative layer 28 may be thicker in certain regions than others, or it may have a curved or non-planar shape.

The substrate 30 is semi-rigid and generally defines the overall shape and structure of the panel 14. An example of a suitable semi-rigid construction is injection molded glass-reinforced polypropylene having a wall thickness T in a range from 0.5 to 2.25 mm. This thin-walled structure is distinguishable from typical substrates having a thickness in the range of 2.5 mm to 4.0 mm (standard-walled). Without the structural modifications described herein, the thin-walled structures falling into the range of 0.5 to 2.25 mm can suffer from a high degree of post-form warpage, which can be particularly detrimental in larger panels, such as the instrument panel 16. Along longer edges, such as the windshield edge 18, this post-form warpage can be even more pronounced in the thin-walled structures. Minimizing this post-form warpage can result in a more structurally sound thin-walled substrate 30. The post-form warpage may be a result of the injection molding process, which causes internal stress in the substrate 30. If, for example, there is post-form warpage that varies the shape of the substrate 30 from the nominal CAD model, sometimes, putting the substrate on the foaming tool lid will help bring the part back to nominal. However, after the part is foamed, the injected substrate 30 has memory and will warp back to its original state.

While injection molded plastic is a preferred material for the substrate 30, other materials and combinations of materials exhibiting similar shape-maintaining characteristics may be used. The substrate 30 is described as semi-rigid to distinguish from perfectly rigid (i.e., entirely inflexible), but should be sufficiently rigid to support its own weight and the weight of the decorative layer 28 and the intermediate or foam layer 32, along with any other attached components, without noticeable sagging or bending. The substrate 30 should be able to endure severe temperature extremes without changing shape, and should not exhibit brittle fractures in vehicle collision scenarios. In some embodiments, the panel 14 is a relatively small subpanel of a larger interior panel, in which case, an unreinforced plastic material can be used for the substrate 30. The illustrated substrate 30 also includes reference positioners 36 on the outer side 38 used to position and fix the substrate and any attached layers or components in a repeatable location during manufacture. The outer side 38 generally faces away from the interior cabin 10 of the vehicle 12, while the inner side 40 generally faces toward the interior cabin. The reference positioners 36 on the outer side 38 illustrated in FIG. 2 are but one example of suitable positioners. The substrate 30 may also include one or more substrate openings for the insertion of foam material for the foam layer 32.

The intermediate layer 32 is advantageously a foam layer that can assist the decorative layer 28 in providing desired tactile characteristics to the panel 14 in the form of elastic cushioning that compresses when a force is applied to the outer decorative side 34 of the panel 14 and decompresses when the force is removed to return the decorative layer to its original position. The foam layer 32 can also provide sound deadening and/or have a non-uniform thickness to fill space between the decorative layer 28 and the substrate 30 when the respective contours of the decorative layer and substrate are different from each other. In the illustrated example, the foam layer 32 is a backfilled or a closed pour, foam-in-place material layer formed by introducing a foam material, such as a liquid foam precursor, into a space between the decorative layer 28 and the substrate 30, with at least the decorative layer constrained in the desired final shape in a foam molding tool. The foam material expands to fill and take the shape of the space and cures to form the foam layer 32. One suitable foam layer material is polyurethane foam formed from a liquid precursor material comprising a polyol and a diisocyanate. Other foam materials (e.g., polyolefin-based) are possible, as are other foaming processes (e.g., use of a heat-activated foaming agent). The foam layer 32 may range in thickness from 1 mm to 10 mm, can be separately provided and adhered with adjacent material layers. In other embodiments, the intermediate layer 32 may be a fabric spacer or some other material layer that spaces the decorative layer 28 from the substrate 30.

Figure 4:
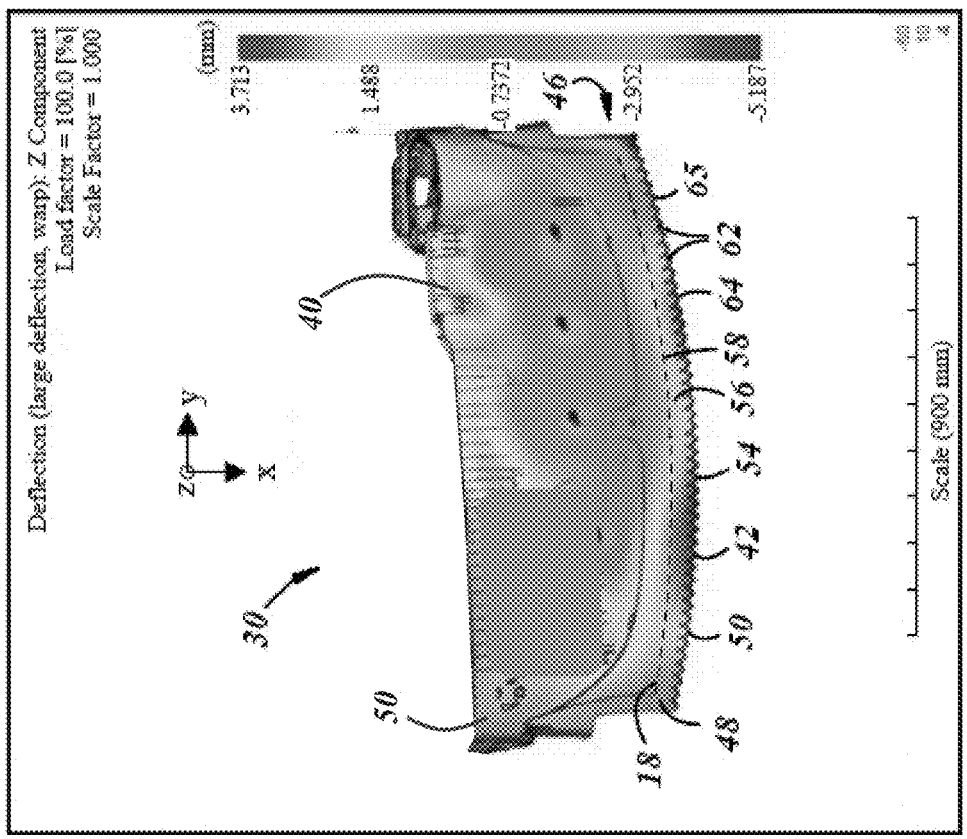
FIG. 4 is a CAE model of an embodiment of a substrate for the instrument panel depicted in the figures and described herein.
Figure 3:
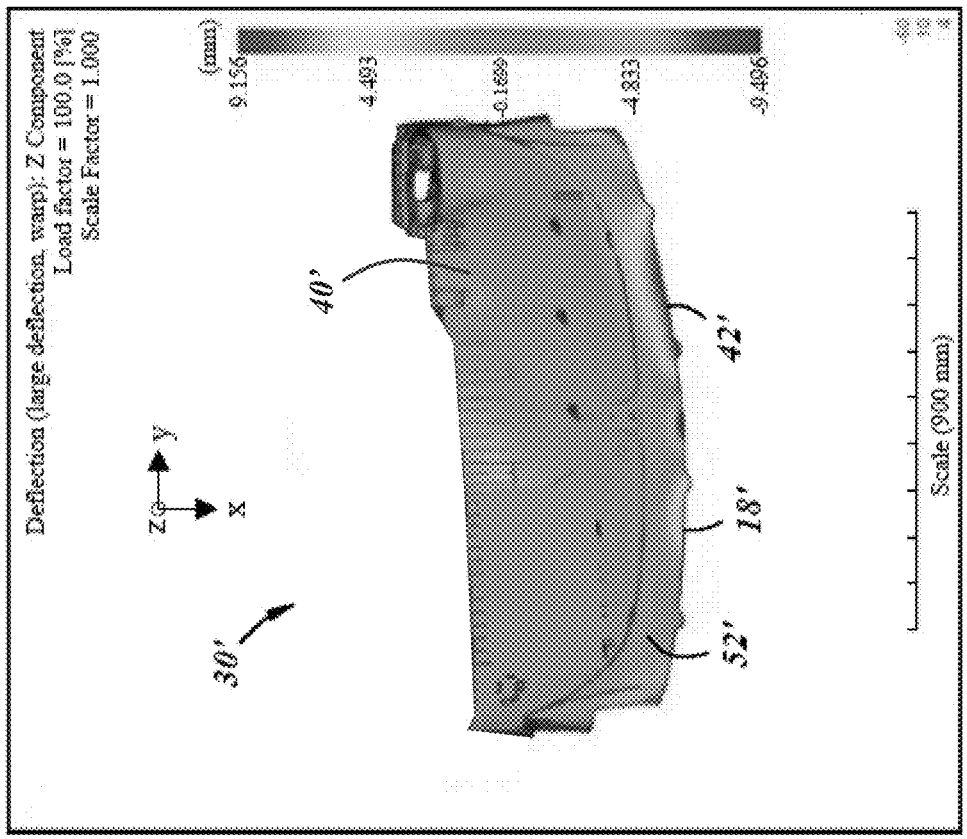
FIG. 3 is a computer-aided engineering (CAE) model of a prior art substrate.

FIGS. 3 and 4 are CAE mold flow analyses that show the post-form warpage 42 that can occur during manufacture and be present after the foam layer 32 is introduced between the substrate 30 and the decorative layer 28. Manufacturing the substrate 30 can cause undesirable post-form warpage if the substrate thickness (at least along the edge) is between 0.5 and 2.25 mm. FIG. 3 shows the overall structure of a prior art substrate 30' having a thin-walled structure of 2 mm. The CAE model shows the large deflection or warp, and along the windshield edge 18', there is an area of post-form warpage 42' that is about 18 mm (see scale on right side of FIG. 3) in the Z direction. This amount of post-form warpage 42', particularly at the windshield edge 18' in the Z direction, can cause performance and/or installation problems. Advantageously, the amount of post-form warpage 42 should be less than 15 mm, or more particularly, less than 10 mm. This amount of post-form warpage 42 makes the interior panel 14 suitable for proper mating against the windshield 44 of the vehicle 12. The XYZ axes are shown in the figures and correspond to the vehicle's longitudinal, lateral, and vertical axes once the panel 14 is installed in the vehicle 12.

In the FIG. 4 embodiment, the substrate 30 has a post-form warpage 42 along the windshield edge 18 that is about 8 mm (see scale on right side of FIG. 4). Accordingly, the CAE modelling shows a 10 mm warp improvement in this particular embodiment. The post-form warpage 42 is the amount of warpage or deflection present at the edge region (or more particularly, at the windshield edge 18 or an alternate edge depending on the panel) before the panel 14 is installed in the vehicle 12. Thus, the post-form warpage 42 can be measured by comparing the degree of warpage in the substrate 30 after it is fully manufactured (pre-install) with the nominal CAD data or the mold dimensions. The manufactured panels 14 can be scanned in a lab or gun-sighted, to cite a few examples, to ascertain the amount of post-form warpage 42 that is present. In another example, the panels 14, before install, can be analyzed with a coordinate measuring machine (CMM) and the output is compared against the nominal CAD and/or a geometric dimensioning and tolerancing (GD&T) system. In the illustrated embodiment, the post-form warpage 42 is the degree of warpage in the Z direction; however, with other vehicle panels, it may be desirable to control the degree of post-form warpage in other directions, depending on the way in which the panel is installed in the vehicle.

To achieve a suitable, minimal level of post-form warpage 42 on a thin-walled substrate having a thickness between 0.5 and 2.25 mm, or more particularly 2 mm in the illustrated embodiment, an edge region 46 near the windshield edge 18 is structurally modified to help impart rigidity to counteract the forces applied to the substrate 30 during manufacture. The edge region 46 includes the windshield edge 18 or another panel edge, an extension flange 48, and a serpentine rib 50. As detailed further below, the serpentine rib 50 can be integrally molded with a main body 52 of the substrate 30. The substrate 30 is then put in a mold with the decorative layer 28, and the panel 14, 16 is foamed to create the foam layer 32. The serpentine rib 50 is then removed before the panel 14, 16 is installed in the vehicle 12. In embodiments that include the serpentine rib 50 on an extension flange 48, the extension flange 48 may also be removed before the panel 14, 16 is installed in the vehicle 12. Removal can be accomplished via punching or milling, to cite a few examples.

Figure 5:
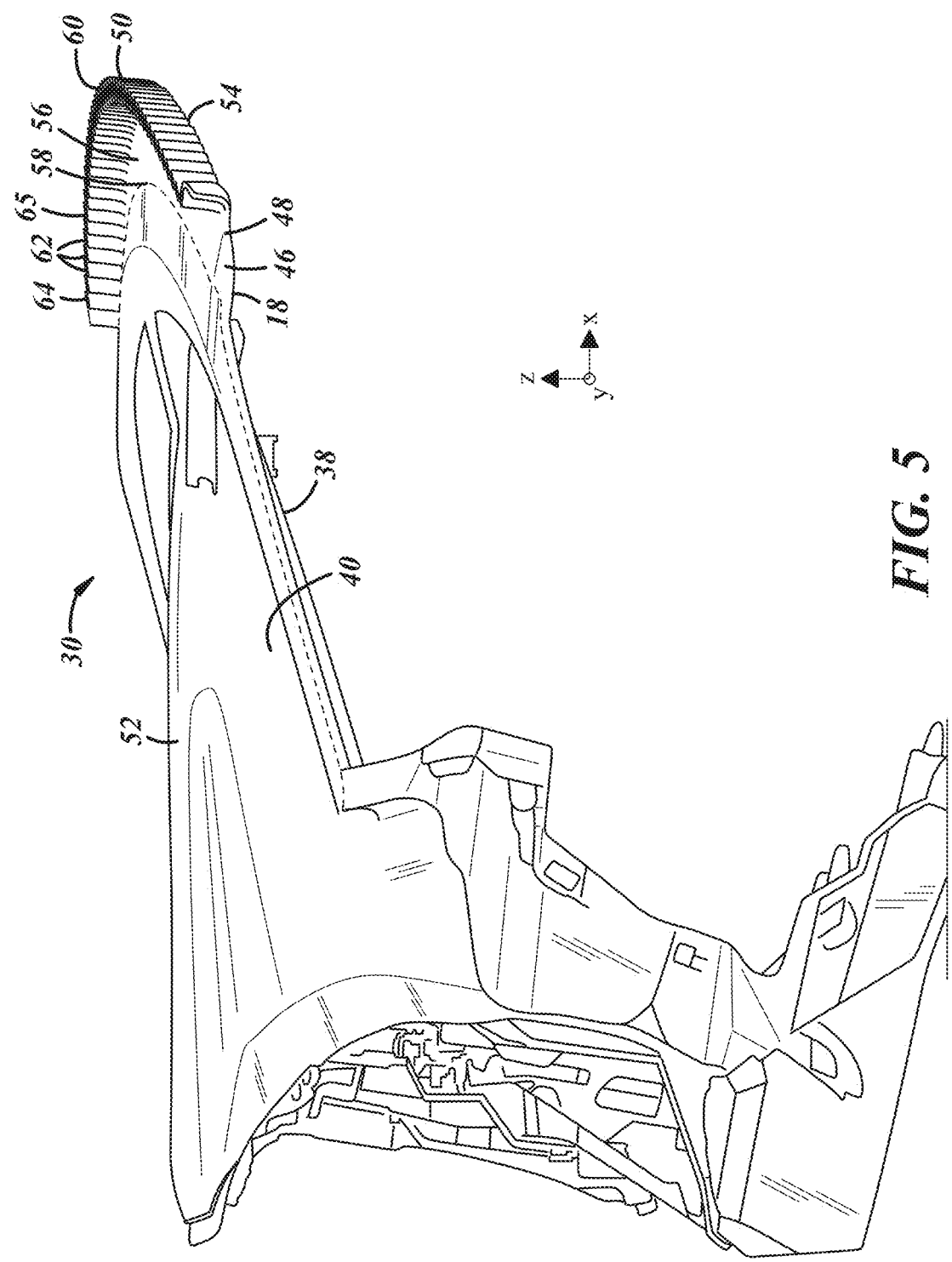
FIG. 5 is side view of the substrate of FIGS. 1, 2, and 4, showing its serpentine rib.
Figures 6, 7:
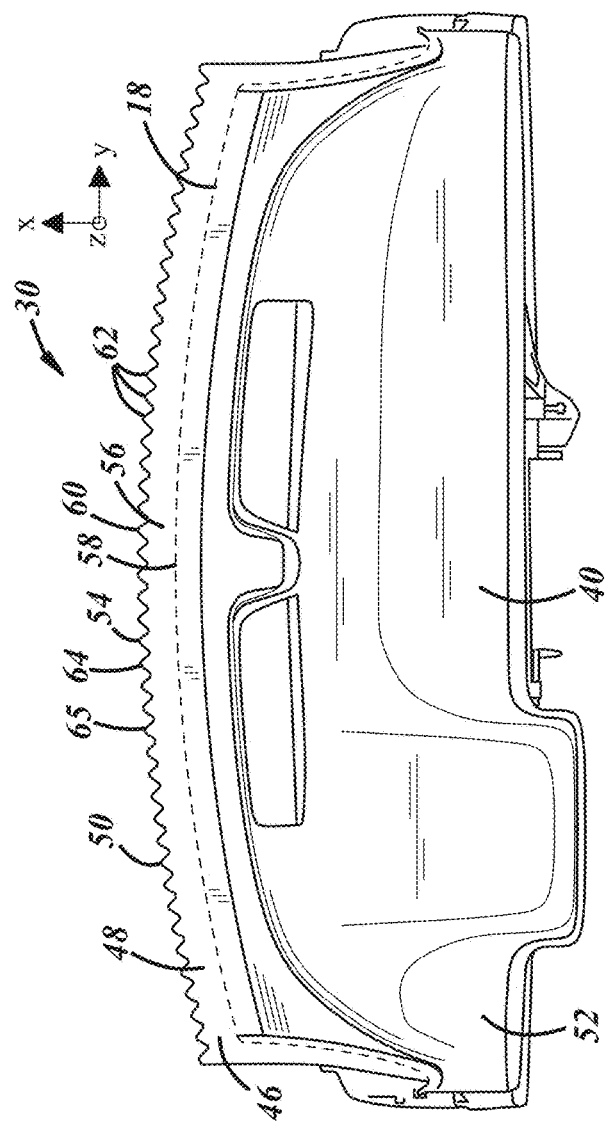
FIG. 6 a top view of the substrate of FIGS. 1.2, 4, and 5.
FIG. 7 is an enlarged view of a portion of the serpentine rib of FIGS. 1, 2, and 4-6.

FIGS. 5-7 more particularly illustrate the substrate 30 and the structural features of the edge region 46 such as the extension flange 48 and the serpentine rib 50. The extension flange 48 starts at the windshield edge 18 and continues to a distal edge 54 where the serpentine rib 50 is located. The extension flange 48 can help keep the substrate 30 in the line of draw of the injection mold. The extension flange 48 has a primary arc 56 which corresponds in shape to the primary arc 58 of the windshield edge 18, which matches the contour of the windshield 44 in the vehicle 12. The serpentine rib 50 also has a primary arc 60 which matches the contour of the primary arc 56, the primary arc 58, and the contour of the windshield 44. Each primary arc 56, 58, 60 is a single central curve that is configured to mimic the contour of the windshield 44.

The extension flange 48 defines most of the area of the edge region 46 and extends from the windshield edge 18 toward the distal edge 54. The extension flange 48 may have a different thickness than the thickness T of the substrate main body 52, or it may have the same thickness. The extension flange 48 provides a small, generally planar area along the windshield edge 18 that can be milled, punched, or otherwise removed after the panel 14, 16 is foamed. In some embodiments, the extension flange 48 is located at an angle with respect to the body 52 at the windshield edge 18. This, or scribe lines for example, can help demarcate the area to be removed after foaming and help create a cut line or indicator at the windshield edge 18.

The serpentine rib 50 is located along a majority, or in this embodiment, an entirety of the distal edge 54 of the extension flange 48. This arrangement provides increased structural rigidity at the edge region 46, which can decrease the post-form warpage 42 in the Z direction at the windshield edge 18 so it is at a suitable amount (e.g., less than 15 mm or less than 10 mm, preferably). The serpentine rib 50 has a corrugated, sinusoidal shape with a plurality of undulations 62 (only a few are labeled for clarity purposes, and in the enlarged view of FIG. 7, each undulation is labeled as 62a-f). In this embodiment, there are no spaces between the undulations 62, as each undulation goes straight into another undulation without breaks or straight gap portions between neighboring undulations. To be considered a "serpentine" rib, the rib needs to have three or more undulations that are uninterrupted by a straight or gap portion. Thus, with respect to the prior art embodiment shown in FIG. 3, this would not be a serpentine rib because there are straight gap portions between each undulation located on the windshield edge 18'.

The serpentine rib 50 projects up from the extension flange 48 in the Z direction, but it is possible to locate the serpentine rib 50 in different locations beyond that shown explicitly in the figures. For example, the serpentine rib could project down from the extension flange 48, also in the Z direction. Or, the serpentine rib 50 may not be located on the extension flange 48. In some embodiments the serpentine rib 50 could be located on the outer side 38 and/or inner side 40 along the main body portion 52 of the substrate 30. If, for example, the serpentine rib 50 is located on the outer side 38, it could then be milled or otherwise removed down to the outer side after foaming. The serpentine rib 50 may be completely orthogonal with respect to the extension flange 48, or it may be angled (up to 25 degrees either way along the X axis from what is illustrated in the figures may still be considered to be extending in the Z direction). Projecting in the Z direction can make it easier to remove in a subsequent milling or punching operation.

The number of undulations 62 in the serpentine rib 50 will vary depending on the size and shape of the part being formed. In the illustrated embodiment, with a larger panel 14 such as the instrument panel 16, more undulations are needed to help maintain the structural integrity of the larger edge 18. Accordingly, more than 40 undulations are preferred with a panel comparable in size to an instrument panel. Other smaller panels will likely have less undulations. In some embodiments, however, smaller panels can have a comparable number of undulations to what is illustrated, just with a smaller pitch or wavelength λ.

With particular reference to FIG. 7, the serpentine rib 50 begins at the distal edge 54 and extends up to a top terminal edge 64 with the sinusoidal wall 65 extending therebetween. Each undulation 62 includes a peak 66 and a trough 68 with a sloped wall 70 located between the peak and the trough (only one undulation 62b is labeled with subcomponents for clarity purposes, but the teachings relating to the undulation 62b are also applicable to the other undulations as well). As discussed above, the plurality of undulations 62 are continuous, meaning that there is no straight gap or the like between adjoining undulations such that the sinusoidal wall 65 goes from peak 66 to sloped wall 70 to trough 68 to sloped wall to peak, etc. The peak angle α is between about 30° and 60° inclusive, or more particularly 45°, Having a peak angle α of 45°, as well as a trough angle of 45° as illustrated, can provide a more symmetrical structure that can be easier to manufacture.

In an advantageous embodiment, the ratio of the amplitude A to the pitch or wavelength λ is between 1:6 and 1:2, or more particularly in the illustrated embodiment, 1:4. In this embodiment in particular, the amplitude A is about 7 mm, and the wavelength is about 28 mm. This arrangement, again, can be easier to manufacture, particularly when integrally forming the serpentine rib 50 with the substrate 30 in an injection molding process. One potential reason for this is that the modifications needed in the tooling can be less cumbersome when creating this particularly sized serpentine rib 50. These configurations for the undulations 62 were designed to strategically control the post-form warpage 42, and verified using CAE mold flow analysis and injection trials.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel, comprising:
   a substrate having a thickness between 0.5 mm and 2.25 mm, inclusive;
   a decorative layer; and
   an intermediate layer located between the substrate and the decorative layer, wherein a post-form warpage of the substrate is less than 15 mm at an edge region of the substrate.

2. The vehicle interior panel of claim 1, wherein the edge region is a windshield edge and the post-form warpage is in a Z direction.

3. The vehicle interior panel of claim 2, further comprising a serpentine rib located near the windshield edge.

4. The vehicle interior panel of claim 3, wherein an extension flange is located at least partially between the windshield edge and the serpentine rib.

5. The vehicle interior panel of claim 4, wherein the extension flange extends out from the windshield edge in an X direction and the serpentine rib projects from the extension flange in the Z direction.

6. The vehicle interior panel of claim 4, wherein the serpentine rib is located along a majority of a distal edge of the extension flange.

7. The vehicle interior panel of claim 4, wherein the windshield edge has a primary arc, the extension flange has a primary arc, and the serpentine rib has a primary arc, and each primary arc is configured to match a contour of a windshield.

8. The vehicle interior panel of claim 3, wherein the serpentine rib includes a plurality of undulations.

9. The vehicle interior panel of claim 8, wherein each undulation has a peak and the peak is an angle between 30° and 60°, inclusive.

10. The vehicle interior panel of claim 8, wherein the plurality of undulations includes more than 20 undulations.

11. The vehicle interior panel of claim 8, wherein each undulation has an amplitude and a wavelength, and a ratio of the amplitude to the wavelength is between 1:6 and 1:2, inclusive.

12. A method of manufacturing the vehicle interior panel of claim 1, comprising the steps of:
    molding the substrate; and
    foaming a foam layer between the decorative layer and the substrate to form the intermediate layer.

13. The method of manufacturing of claim 12, wherein the substrate is molded with a serpentine rib.

14. The method of manufacturing of claim 13, wherein the serpentine rib is located on an extension flange.

15. The method of manufacturing of claim 14, further comprising the step of removing the serpentine rib and the extension flange after the foaming step.

* * * * *